S. J. DAILY.
Feed-Cooker.
No. 197,613.  Patented Nov. 27, 1877.
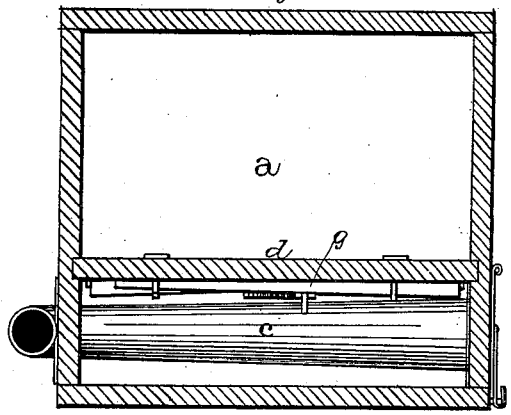
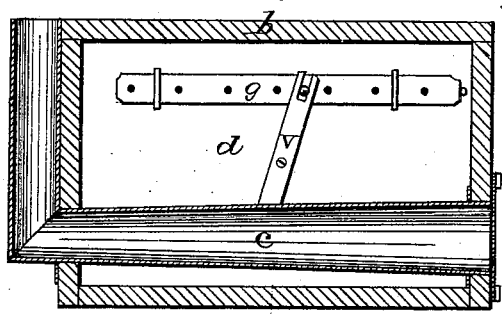  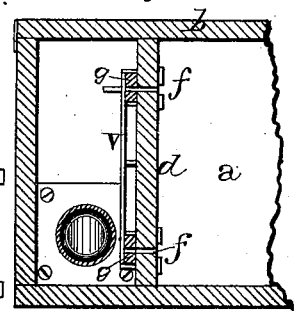
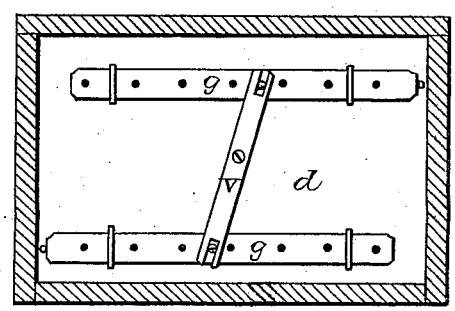
WITNESSES.  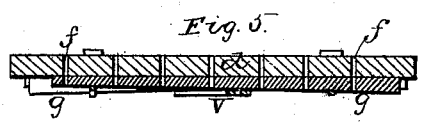  INVENTOR.

UNITED STATES PATENT OFFICE.

SAMUEL J. DAILY, OF KANSAS CITY, MISSOURI.

IMPROVEMENT IN FEED-COOKERS.

Specification forming part of Letters Patent No. 197,613, dated November 27, 1877; application filed October 3, 1877.

*To all whom it may concern:*

Be it known that I, SAMUEL J. DAILY, of Kansas City, in the county of Jackson and State of Missouri, have invented certain new and useful Improvements in Feed-Cookers; and I do hereby declare the following to be a full, clear, and exact description of the invention, such as will enable others skilled in the art to which it pertains to make and use it, reference being had to the accompanying drawing, which forms part of this specification.

My invention relates to an improvement in feed-cookers; and it consists in forming the fire-chamber in one side of the box, so as to entirely isolate it from the food that is being cooked.

It further consists in placing a perforated partition between the fire-chamber and the feed to be cooked, and providing it with slides, so as to cut the heat and steam off from the food whenever it may be desired to interrupt the cooking for the time being.

In the accompanying drawing, Figure 1 is a vertical section of my cooker through the fire-chamber. Fig. 2 is a plan view of the cooker with the cover removed. Fig. 3 is a vertical cross-section, and Figs. 4 and 5 are detail views, of the slides.

$a$ represents a tub, box, or trough, in which the food to be cooked is placed, and which is provided with a hinged cover, $b$. Passing through the lower part of this tub, at one side, is the iron pipe $c$, in which the fire is made for cooking the food, said pipe being made tapering, so as to prevent the heat from escaping too rapidly. At a suitable distance from one side of this pipe is placed a perforated partition, $d$, which separates the food being cooked from the pipe, and thus forms a heating-chamber in the tub or box, so that all the heated water or steam that passes through to the food must pass through the small openings made in it. In order to regulate the passage of the hot water and steam to the food, so as to interrupt the cooking at any time it may be desired, this perforated board is provided with the two slides $g$, which are made wedge-shaped, and connected together by the rod $v$, so as to cause them to move together, and by means of which all of the openings $f$ can be at once closed, and the passage of the hot water and steam either prevented entirely or just enough allowed to pass through to keep the food warm without cooking it any further.

By thus placing the fire-chamber in the side of the tub or box, the iron is prevented from coming in contact with the food, whereby the tub can be quickly and readily cleaned whenever desired, and can be used for bathing, hot-air baths, washing, and other purposes to which it could not possibly be applied if the fire-chamber passed through the center of the bottom, as is usually the case.

The partition is here shown as having two rows of holes, $f$, through it—the lower one for the hot water, and the upper one for the steam, to pass through; but any other arrangement of holes that may be preferred may be made.

The partition is made removable, and serves to keep the food from being burned or scorched, and allows the box to be used as a bath-tub.

By making the pipe $c$ tapering, the heat does not escape so rapidly, the water is heated faster, and a common stove-pipe may be fitted on the small end to carry away the smoke.

Having thus described my invention, I claim—

The tub $a$, provided with the perforated partition $d$, in combination with the pipe $c$ and a slide or slides, $g$, for closing the perforations $f$, substantially as shown and described.

In testimony that I claim the foregoing I have hereunto set my hand this 25th day of September, 1877.

SAMUEL J. DAILY.

Witnesses:
S. A. SHAW,
GEO. B. SANFORD.